US010262792B2

United States Patent
Karnik (10) Patent No.: US 10,262,792 B2
(45) Date of Patent: Apr. 16, 2019

(54) NEAR FIELD COMMUNICATION FOR FIELD DEVICES

(71) Applicant: Endress+Hauser GmbH+Co. KG, Maulburg (DE)

(72) Inventor: Gautham Karnik, Whitestown, IN (US)

(73) Assignee: Endress+Hauser SE+Co. KG, Maulburg (DE)

(*) Notice: Subject to any disclaimer, the term of this patent is extended or adjusted under 35 U.S.C. 154(b) by 0 days.

(21) Appl. No.: 15/684,221

(22) Filed: Aug. 23, 2017

(65) Prior Publication Data

US 2019/0066915 A1    Feb. 28, 2019

(51) Int. Cl.
| | |
|---|---|
| *H04B 5/00* | (2006.01) |
| *H01F 27/02* | (2006.01) |
| *H01F 27/24* | (2006.01) |
| *H01F 27/28* | (2006.01) |
| *H01F 38/14* | (2006.01) |
| *H02J 50/10* | (2016.01) |

(52) U.S. Cl.
CPC ............ *H01F 38/14* (2013.01); *H01F 27/02* (2013.01); *H01F 27/24* (2013.01); *H01F 27/2823* (2013.01); *H02J 50/10* (2016.02); *H04B 5/0075* (2013.01); *H01F 2038/143* (2013.01)

(58) Field of Classification Search
CPC .......... H01F 38/14; H01F 27/02; H01F 27/24; H01F 27/2823; H01F 2038/143; H02J 50/10; H04B 5/0075
USPC .................................................. 455/41.1, 40
See application file for complete search history.

(56) References Cited

U.S. PATENT DOCUMENTS

| | | | | |
|---|---|---|---|---|
| 6,118,249 A | * | 9/2000 | Brockmann ............ | H02J 7/025 320/108 |
| 2013/0170258 A1 | * | 7/2013 | Calvin .................... | H01F 38/14 363/64 |
| 2014/0106687 A1 | * | 4/2014 | Allgaier ................. | H01F 38/14 455/90.2 |
| 2014/0163646 A1 | * | 6/2014 | Tischendorf ....... | A61N 1/36139 607/60 |
| 2014/0184245 A1 | * | 7/2014 | Hara ....................... | G06F 3/038 324/655 |
| 2014/0368196 A1 | * | 12/2014 | Stolarczyk ............... | G01V 3/12 324/329 |
| 2015/0247743 A1 | * | 9/2015 | Horie ...................... | G01L 1/142 324/207.17 |
| 2016/0072557 A1 | * | 3/2016 | Ahola .................. | H04B 5/0037 455/41.1 |
| 2016/0094051 A1 | * | 3/2016 | Soar ...................... | H04B 5/0031 307/9.1 |
| 2017/0270780 A1 | * | 9/2017 | Benkert ............... | H04B 5/0075 |
| 2017/0352468 A1 | * | 12/2017 | Hundhammer ........... | H01F 1/34 |

(Continued)

*Primary Examiner* — Edward F Urban
*Assistant Examiner* — Max Mathew
(74) *Attorney, Agent, or Firm* — Mark A. Logan; PatServe (57) ABSTRACT

A device for wireless communication with a process automation field device. The device may include an inductive interface in the field device embodied to couple with a complementary inductive interface of a service tool. The field device inductive interface may be embodied to inductively transfer data to the service tool and to inductively receive data and energy from the service tool. The energy received from the service tool may be sufficient for operating the field device's inductive interface. A method of wireless communication is also disclosed.

4 Claims, 4 Drawing Sheets

(56) References Cited

U.S. PATENT DOCUMENTS

2018/0026479 A1\* 1/2018 Boger ..................... H02J 50/12
                                                    307/104
2018/0114625 A1\* 4/2018 Neudecker ............ H01F 27/266

\* cited by examiner

NEAR FIELD COMMUNICATION FOR FIELD DEVICES

TECHNICAL FIELD

The present disclosure relates generally to wireless, contactless communication with process automation field devices.

BACKGROUND OF THE INVENTION

Process automation field devices are discrete devices used in a process automation system for the measurement of some physical phenomena or for the control of some device such as a valve, pump, switch, etc. In a typical embodiment of a field device, the field device includes electronics such as a microcontroller, memory, transducers, and analog-to-digital converters. The field device may include digital and analog outputs, and the field device may include a user interface such as a display screen. A field device will include a housing that encloses and protects the components of the field device.

A process automation field device usually includes a communication interface for communicating with the central controller of the process automation system. This communication interface may be a wired interface such a 4-20 mA current loop, a HART network, or a digital field bus, or the communication interface may be a wireless interface such as WiFi or wireless HART There is often a need for point-to-point communication with a field device. For example, a technician servicing or calibrating a field device may need access to the field device directly for reading, modifying, and writing the field device's internal parameters. For point-to-point communication, access of the field device via the process automation control network (e.g., 4-20 mA, FieldBus, HART, etc.) may not be practical or possible. Therefore a process automation field device may include an additional communication interface such as a wired serial interface or a wireless interface such as a Bluetooth Low Energy interface for point-to-point communication.

However, constraints on the design of the field device may make the inclusion of these point-to-point communication interfaces impractical. For example, safety design constraints may prevent the inclusion of electrical contacts for a wired serial interface, or a metal field device housing may interfere with the operation of wireless communications antennae. In addition, the power requirements for a field device may prevent the inclusion of a point-to-point communication interface; there may not be sufficient power available to the field device to operate the point-to-point communication means in addition to the field device's normal functions.

Accordingly, there remains a need for further contributions in this area of technology.

SUMMARY OF THE INVENTION

To solve these problems with the current state of the art, this disclosure discloses a wireless, contactless, point-to-point communication means for communication with field devices in a process automation system. However, such communication means is not limited to use in field devices or to use in process automation systems.

The application discloses a field device comprising a housing including an orifice; a control electronics disposed within the housing and embodied to operate the field device; an inductive interface including a ferrite core and a plurality of wire loops circumferentially surrounding a portion of the ferrite core, wherein the ferrite core is at least partially disposed within the housing such that an outer end of the ferrite core extends through the orifice in the housing and such that the plurality of wire loops is disposed within the housing; and a communications circuit electrically connected to the plurality of wire loops and to the control electronics, the communication circuit disposed within the housing, wherein the inductive interface is embodied to inductively couple with a complementary inductive interface and to transfer data with the complementary inductive interface.

The field device may be further embodied to receive energy from the complementary inductive interface sufficient to energize and operate the communication circuit and to transfer the received energy to the communication circuit.

The outer end of the ferrite core of the field device may extend beyond the housing, and the complementary inductive interface may include a plurality of complementary wire loops embodied to partially circumferentially surround the ferrite core. Or the outer end of the ferrite core may extend into the orifice and be flush with an outside surface of the field device housing, and the complementary inductive interface may include a complementary ferrite core and a plurality of complementary wire loops circumferentially surrounding a portion of the complementary ferrite core.

The field device inductive interface may be embodied to inductively couple with a complementary inductive interface such that the outer end of the ferrite core and an outer end of the complementary ferrite core are separated by an air gap no more than approximately 2 millimeters.

The ferrite core may be configured in a rod shape. In some embodiments the ferrite core may be configured in a "C" shape having two outer ends, and the housing may include two orifices shaped and disposed to enable the two outer ends of the ferrite core to extend through the two orifices. In other embodiments the ferrite core may be configured in an "E" shape having three outer ends, and the housing may include three orifices shaped and disposed to enable the three outer ends of the ferrite core to extend through the three orifices. In yet another embodiment the ferrite core may be configured in a toroid shape and the orifice may be configured to enable the toroid to extend at least partially through the housing such that at least a portion of an open center of the toroid is outside the housing.

The application also discloses a method of communicating with a field device. The method may comprise: providing a field device including a housing including an orifice, a control electronics disposed within the housing and embodied to operate the field device, an inductive interface including a ferrite core and a plurality of wire loops circumferentially surrounding a portion of the ferrite core, wherein the ferrite core is at least partially disposed within the housing such that an end of the ferrite core extends through the orifice in the housing and such that the plurality of wire loops is disposed within the housing, and a communications circuit electrically connected to the plurality of wire loops and to the control electronics, wherein the inductive interface is embodied to inductively couple with a complementary inductive interface and to transfer data with the complementary inductive interface; providing a communication device including the complementary inductive interface; reversibly connecting the complementary inductive interface with the inductive interface such that the complementary inductive interface and the inductive interface are enabled to inductively couple; energizing the complementary inductive interface thereby energizing the inductive interface via an inductive coupling of the complementary inductive interface with the inductive interface; communicating data across the inductive interface.

In the disclosed method, the end of the ferrite core may extend beyond the housing, and the complementary inductive interface may include a plurality of complementary wire loops embodied to partially circumferentially surround the ferrite core. The method may include reversibly connecting the complementary inductive interface with the inductive interface by partially circumferentially surrounding the ferrite core with the plurality of complementary wire loops.

In the disclosed method, the complementary inductive interface may include a complementary ferrite core and a plurality of complementary wire loops circumferentially surrounding a portion of the complementary ferrite core. The method may include reversibly connecting the complementary inductive interface with the inductive interface by axially aligning the complementary ferrite core with the ferrite core such that an air gap between the complementary ferrite core and the ferrite core is no more than approximately 2 millimeters.

In the disclosed method, the inductive interface may include a ferrite core configured in a "C" shape having two outer ends, and the complementary inductive interface may also include a complementary ferrite core configured in a "C" shape having two outer ends. The method may include reversibly connecting the complementary inductive interface with the inductive interface by aligning the two outer ends of the complementary ferrite core with the two outer ends of the ferrite core such that an air gap between the two outer ends of the complementary ferrite core and the two outer ends of the ferrite core is no more than approximately 2 millimeters.

In the disclosed method, the inductive interface may include a ferrite core configured in a "E" shape having three outer ends, and the complementary inductive interface may also include a complementary ferrite core configured in a "E" shape having three outer ends. The method may include reversibly connecting the complementary inductive interface with the inductive interface by aligning the three outer ends of the complementary ferrite core with the three outer ends of the ferrite core such that an air gap between the three outer ends of the complementary ferrite core and the three outer ends of the ferrite core is no more than approximately 2 millimeters.

BRIEF DESCRIPTION OF THE DRAWINGS

The described embodiments and other features, advantages, and disclosures contained herein, and the manner of attaining them, will become apparent and the present disclosure will be better understood by reference to the following description of various embodiments of the present disclosure taken in conjunction with the accompanying drawings, wherein.

DETAILED DESCRIPTION

The present disclosure discloses an apparatus and a method for wireless communication with a process automation field device. According to one aspect of the present disclosure, an inductive interface of a field device embodied to communicate via inductive coupling with a complementary inductive interface is disclosed. In another aspect of the present disclosure, a communication circuit within the field device is energized using energy received over the inductive interface from the complementary inductive interface. Various embodiments of the apparatus and method will now be presented in conjunction with the figures which illustrate the embodiments. It will be understood that no limitation of the scope of this disclosure is thereby intended.

Figure 1:
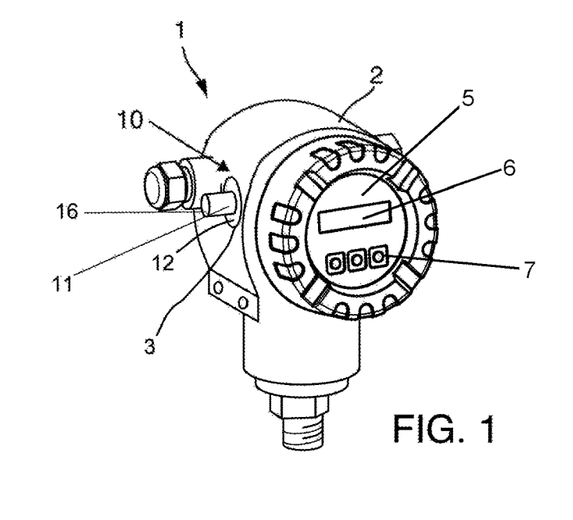
FIG. 1 shows a process automation field device according to an embodiment of the present disclosure.

FIG. 1 shows an embodiment of a field device 1 that includes an inductive interface 10 according to the present disclosure. The inductive interface 10 may include a ferrite core 11. As shown in FIG. 1, the ferrite core 11 may be a rod with an outer end 16. The field device 1 may include a housing 2 that includes an orifice 3 through which the ferrite core 11 may extend such that the outer end 16 is outside the housing 2. Though the ferrite core 11 may extend through the orifice and beyond the housing 2 by some amount, a portion of the ferrite core 11 may remain inside of the housing 2, along with other components of the inductive interface 10. A mounting collar 12 may seal the orifice 3 around the ferrite rod 11 so that gases, dirt, and other foreign matter cannot pass into or out of the field device interior.

In certain embodiments of the field device 1 and its inductive interface 10, the outer end 16 of the ferrite core 11 may still extend into the orifice 3, but the outer end 16 may be flush with an outside surface of the housing 2.

As shown in FIG. 1, the field device 1 may include control electronics 5 embodied to operate the field device 1. The control electronics 5 may include a display screen 6 and buttons 7. The control electronics may further include components not explicitly shown in FIG. 1, such as a microcontroller, memory, and various digital and analog inputs and outputs.

Figure 2:
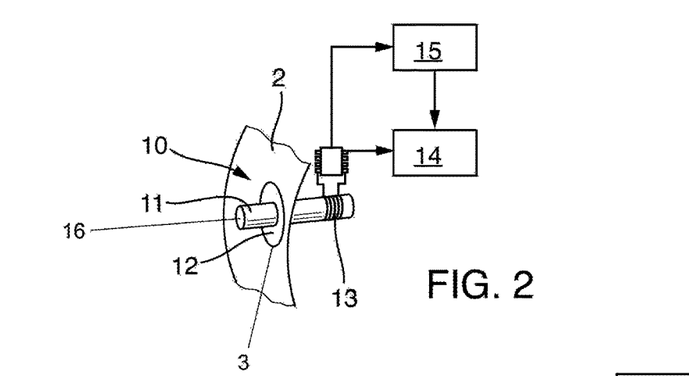
FIG. 2 shows an inductive interface according to embodiment of the present disclosure.

FIG. 2 shows a partial cutaway view of the field device 1, showing various components of the inductive interface 10. In such an embodiment, the outer end 16 of the ferrite core 11 extends beyond the outer surface of the housing 2 by some amount. As shown in FIG. 2, the inductive interface 10 may include a coil of wire 13 disposed within the housing 2 and wrapped circumferentially around a portion of the ferrite core 11. Connected to the coil 13 may be a power conditioning circuit 15 that in turn may be connected to a communication circuit 14.

The power conditioning circuit 15 and the communication circuit 14 operate the inductive interface 10 and manage the modulation and demodulation of data sent and received across the inductive interface 10. The communication circuit 14 may be separate from any other communication circuit within the field device 1, or the communication circuit 14 may be a part of another communication circuit within the field device.

Figure 3:
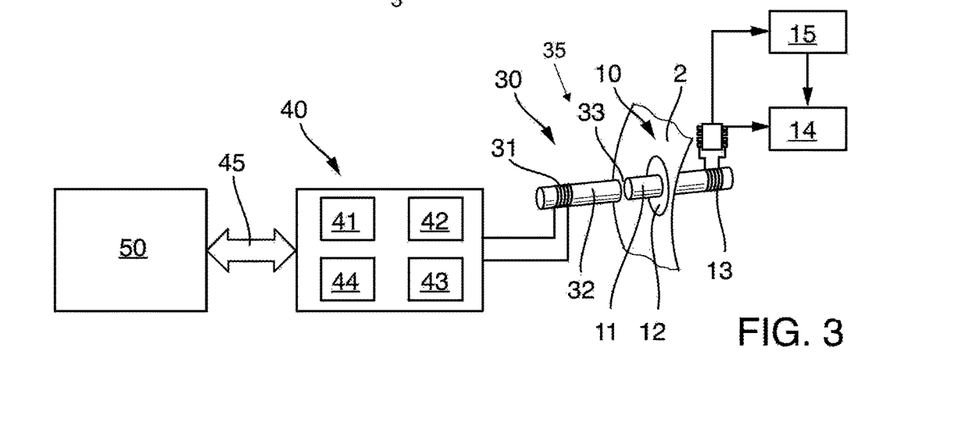
FIG. 3 shows a complementary inductive interface according to embodiment of the present disclosure.

FIG. 3 shows an embodiment of a complementary inductive interface 30 positioned to inductively couple with the inductive interface 10. As shown in FIG. 3, the complementary inductive interface 30 may include a complementary ferrite core 32, which may be a rod, around a portion of which may be wrapped a complementary coil 31. In the illustrated embodiment, the ferrite core 11 and the complementary ferrite core 32 are co-axially aligned. A small air gap 33 less than approximately 2 millimeters may exist between the two aligned ferrite cores 11, 32. An air gap larger than approximately 2 millimeters will reduce the inductive coupling between the two interfaces and result in a less efficient means of energy transfer and communication.

Further shown in FIG. 3 is a radio-frequency identification (RFID) reader 40 attached to the complementary inductive interface 30. The RFID reader 40 may include a microcontroller 41, an oscillator 42, a demodulator 43, and an amplifier 44 among other components. The RFID reader 40 may include a communication interface 45 for interfacing with a service tool 50, or the RFID reader 40 may be incorporated as a part of service tool 50.

The coupling of the complementary inductive interface 30 with the inductive interface 10 forms a transformer 35. A primary winding of the formed transformer is the complementary coil 31 of the complementary inductive interface 30. A secondary winding of the transformer is the coil 13 of the inductive interface 10. The ferrite cores 11, 32 enable the coupling of a magnetic flux between the two coils 13, 31. In operation of the complementary inductive interface 30 coupled to the inductive interface 10, a varying current in the coil 31 of the complementary inductive interface 30 produces a varying magnetic field in and around the coil 31. The flux of this magnetic field is guided along the ferrite core 32 into the ferrite core 11 of the inductive interface 10. The varying magnetic flux within and around the ferrite core 11 induces a varying voltage in the coil 13. Thus the varying current in the coil 31 induces a varying voltage in the coil 13. In the coupling and the operation of the two inductive interfaces 10, 30, there is no galvanic connection between them.

The varying current in the complementary coil 31 may be modulated to convey data across the coupled interfaces 30, 10. The varying, modulated current in complementary coil 31 induces a varying, modulated voltage in the coil 13. The communication circuit 14 may demodulate this varying, modulated voltage in the coil 13 to extract the data therefrom. The energy transfer from the complementary coil 31 to the coil 13 is sufficient for communicating data across the two interfaces 30, 10. However, in some embodiments additional energy is transferred from the complementary coil 31 to the coil 13 sufficient to operate the circuits 14, 15 in the field device 1. The additional energy transfer may be realized by the complementary inductive interface 30 superimposing a higher-energy signal on the modulated data signal. In such embodiments, the energy to operate the circuits 14, 15 comes solely from the inductive interface 10 and not from the field device 1.

Though the ferrite core 11 may extend through the field device housing 2 uncovered, the ferrite core 11 may be coated with a material such as epoxy. The complementary ferrite core 32 may also be coated with a material such as epoxy. The thickness of the coatings must be considered so that the ferrite cores 11, 32 will not be separated from each other by too great a distance when the two ferrite cores 11, 32 are positioned for inductive coupling. A gap between the two ferrite cores 11, 32 larger than approximately 2 millimeters will reduce the inductive coupling between the two interfaces and result in a less efficient means of energy transfer and communication.

Figure 4A:
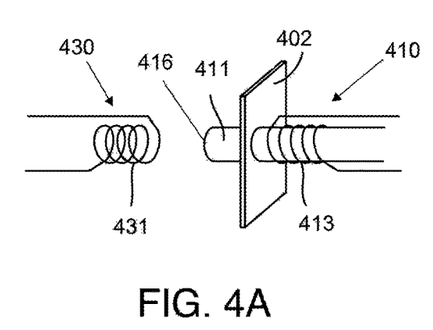
FIG. 4A shows a complementary inductive interface according to an embodiment of the disclosure in which the two interfaces are not coupled.
Figure 4B:
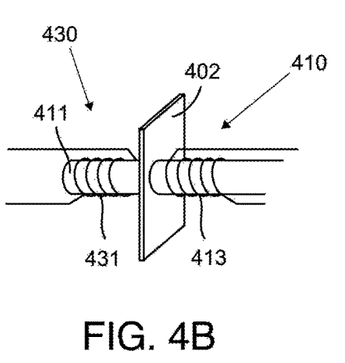
FIG. 4B shows a complementary inductive interface according to an embodiment of the present disclosure in which the two interfaces are coupled.

FIGS. 4A and 4B show an embodiment of a complementary inductive interface 430 that does not include a complementary ferrite core. As shown in FIG. 4A, an inductive interface 410 may include a rod-shaped ferrite core 411, an outer end 416 of the ferrite core 411 extending beyond a field device housing 402 by some amount. The complementary inductive interface 430 may include a complementary coil of wire 431 that fits over the protruding ferrite rod 411. When the complementary coil 431 is placed circumferentially around the ferrite core 411 as shown in FIG. 4B, the ferrite rod 411 may mutually couple a magnetic field of coil 431 with a magnetic field of coil 413.

Figure 5:
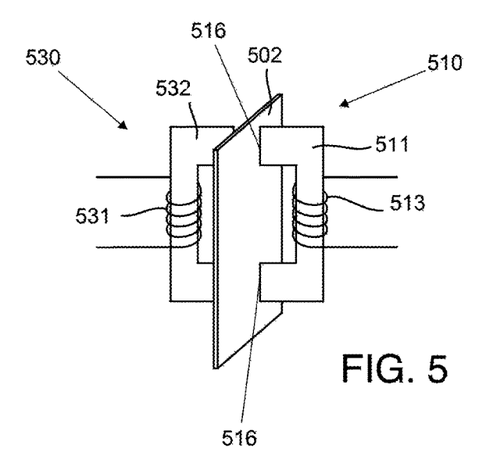
FIG. 5 shows an inductive interface and a complementary inductive interface according to an embodiment of the present disclosure in which the two interfaces include a ferrite core in a "C" configuration.

FIG. 5 shows an embodiment of an inductive interface 510 that includes a "C" shaped ferrite core 511 having two outer ends 516. The field device housing 502 may accommodate the "C" shaped ferrite core by having orifices shaped and disposed to enable the two outer ends 516 to extend through the orifices and thus through the field device housing 502. The inductive interface 510 may include a coil 513 that is wrapped circumferentially around a portion of the ferrite core 511. The complementary inductive interface 530 may include a "C" shaped complementary ferrite core 532 around a portion of which a complementary coil 531 may be circumferentially wrapped. The ferrite core 511 and the complementary ferrite core 532 are similarly sized and shaped to increase inductive coupling between the inductive interface 510 and the complementary inductive interface 530.

Figure 6:
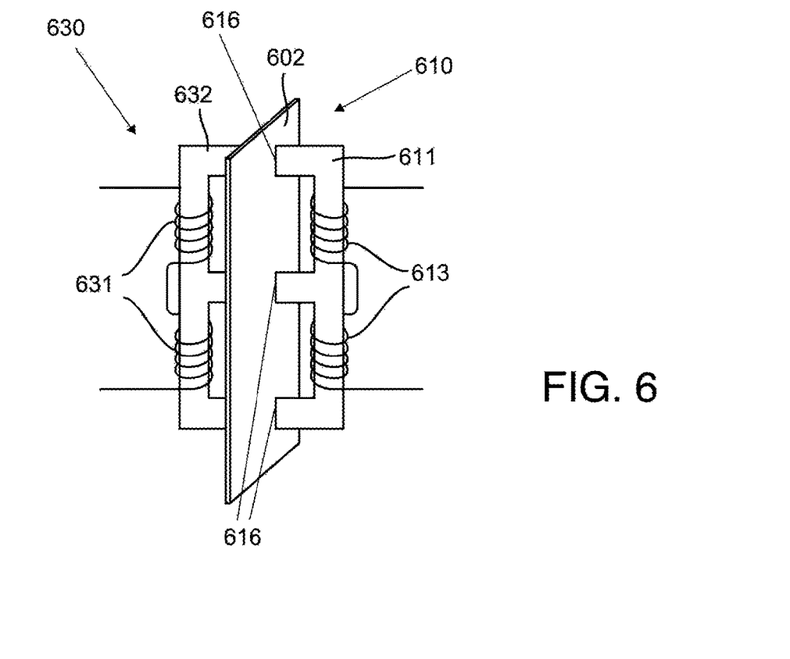
FIG. 6 shows an inductive interface and a complementary inductive interface according to an embodiment of the present disclosure in which the two interfaces include a ferrite core in an "E" configuration.

FIG. 6 shows an embodiment of an inductive interface 610 that includes an "E" shaped ferrite core 611 having three outer ends 616. The inductive interface 610 may include a coil 613 that is wrapped circumferentially around a portion of the ferrite core 611. The coil 613 may be wrapped around at least two different sections of the ferrite core 611, with each part of the coil 613 electrically connected to the other part of the coil 613. The field device housing 602 may accommodate the "E" shaped ferrite core by having orifices shaped and disposed to enable the three outer ends 616 to extend through the orifices and thus through the field device housing 602.

The complementary inductive interface 630 may include an "E" shaped complementary ferrite core 632 around a portion of which a complementary coil 631 may be circumferentially wrapped. The complementary coil 631 may be wrapped around at least two different sections of the complementary ferrite core 632, with each part of the complementary coil 631 electrically connected to the other part of the complementary coil 631. The ferrite core 611 and the complementary ferrite core 632 are similarly sized and shaped to increase inductive coupling between the inductive interface 610 and the complementary inductive interface 630.

Figure 7:
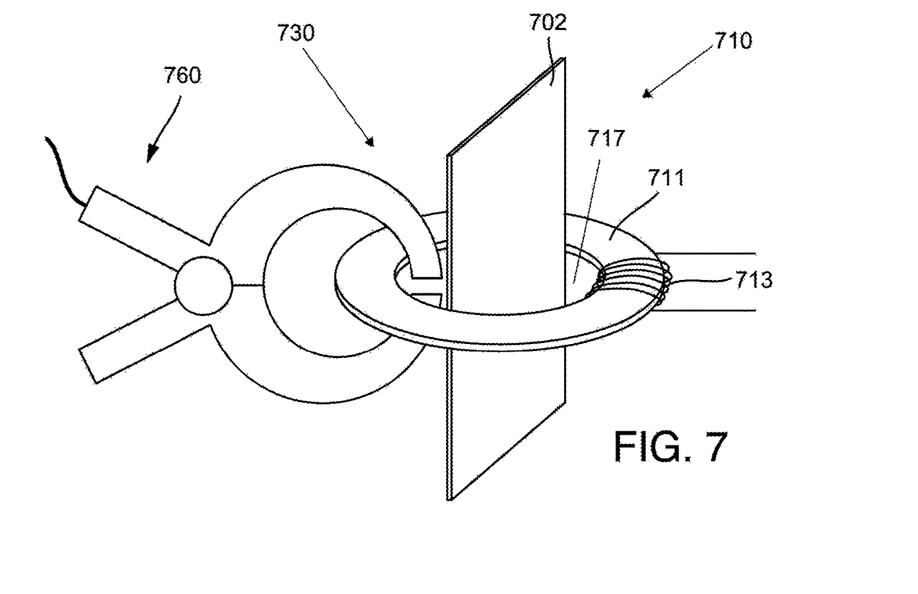
FIG. 7 shows an inductive interface including a toroidal ferrite core and a complementary inductive interface according to an embodiment of the present disclosure.

FIG. 7 shows an embodiment of an inductive interface 710 that includes a toroidal ferrite core 711. The inductive interface 710 may include a coil 713 that is wrapped circumferentially around a portion of the toroidal ferrite core 711. The ferrite core 711 may extend outside of the housing such that at least a portion of an open center 717 of the toroidal ferrite core 711 is outside of the housing 702. As shown in FIG. 7, the complementary inductive interface 730 may include a clamp 760 which may be closed around the toroidal ferrite core 711 so that the clamp 760 and coil 713 may be inductively coupled. Such a clamp is known in the art of inductive current measurement, for example.

In FIG. 7, only a portion of the housing 702 is shown for clarity so that the inductive interface 710 and the complementary inductive interface 730 are not obscured by the housing 702 in the illustration. In an embodiment, the housing 702 may have an orifice to accommodate the toroid ferrite core 711 extending through the housing.

Figure 8:
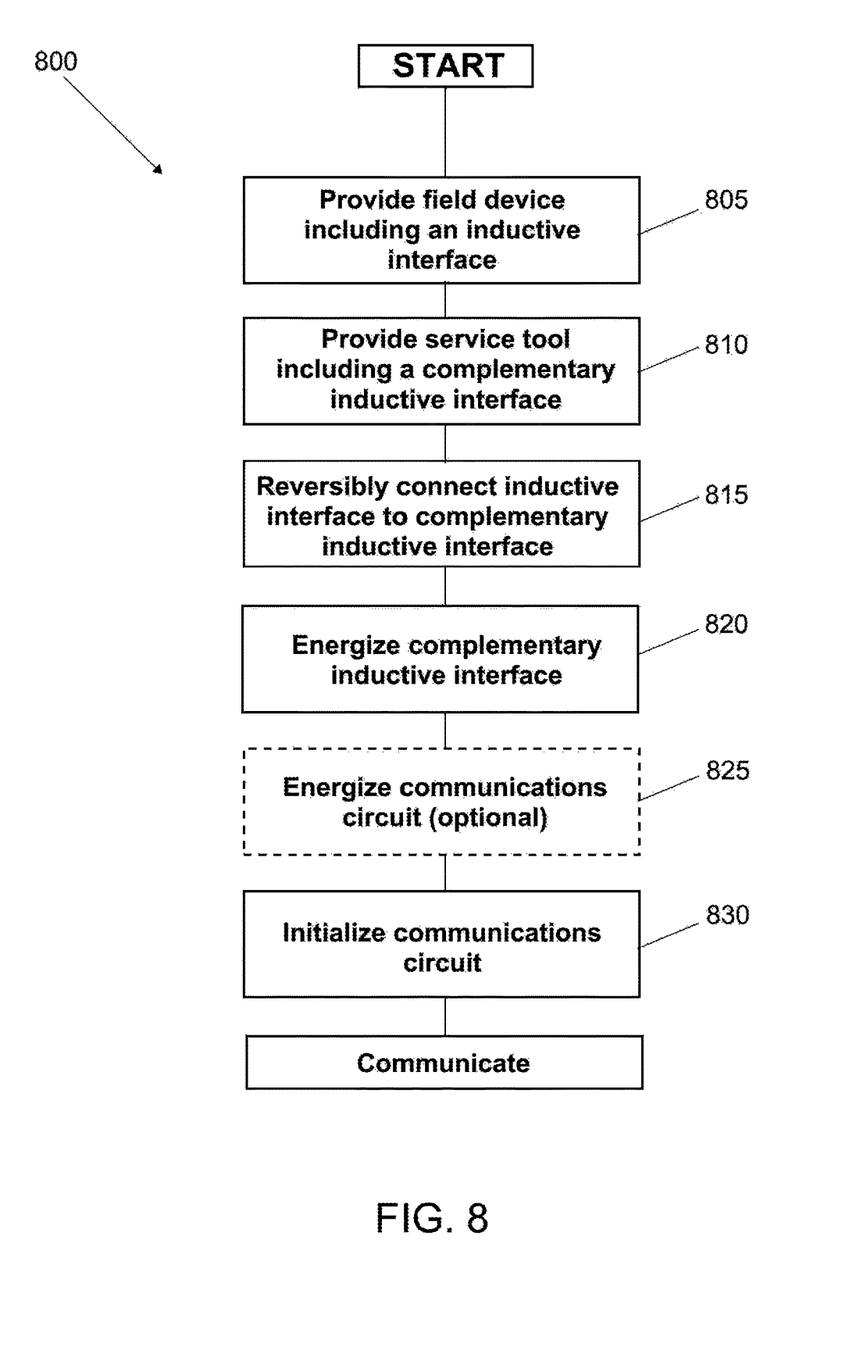
FIG. 8 shows a method of communication according to an embodiment of the present disclosure.

The present disclosure also discloses a method 800 of communicating over the inductive interface 10. Though the method 800 will be described with respect to the inductive interface 10 of FIG. 3, the method 800 is applicable to all disclosed embodiments of the inductive interface 10, 410, 510, 610, and 710. The method 800 according to the present embodiment is shown in FIG. 8.

The method 800 includes a step 805 of providing a field device that includes an inductive interface 10 according to the present disclosure. The inductive interface 10 may include a ferrite core 11 extending through an orifice 3 in the field device housing 2. An outer end 16 of the ferrite core 11 may extend through the orifice 3 and beyond the field device housing 2 by some amount, or the outer end 16 of the ferrite core 11 may extend through the orifice 3 and be flush with an outside wall of the field device housing 2.

The provided inductive interface 10 may include wire 13 looped circumferentially around at least a portion of the ferrite core 11. The wire 13 may be connected to a communication circuit 14 within the field device 1. The communication circuit 14 is embodied to manage the modulation and demodulation of data across the field device inductive interface 10.

The method 800 includes a step 810 of providing a technician's service tool 50 or similar device that includes a complementary inductive interface 30 embodied to inductively couple to the inductive interface 10.

The method 800 includes a step 815 of physically connecting in a reversible manner the complementary inductive interface 30 of the service tool 50 to the inductive interface 10 of the field device 1 such that an inductive coupling may be made between the complementary inductive interface 30 and the inductive interface 10. Reversible manner means the physical connection can be easily intentionally made and separated.

In embodiments of the inductive interface that include a ferrite core extending beyond the field device housing by some amount, such as the inductive interface 410 as shown in FIG. 4A, the complementary inductive interface 430 may include a coil of wire 431 but no ferrite core, such as the complementary inductive interface 430 shown in FIG. 4A, and the physical connecting of the complementary inductive interface 430 to the inductive interface 410 may include placing the coil 431 of the complementary inductive interface 430 around a portion of the ferrite core 411 of the inductive interface 410. In such a connection, the coil 413 of the inductive interface 410 and the coil 431 of the complementary inductive interface 430 are positioned to be magnetically coupled by the single ferrite core 411.

There is no galvanic connection between the complementary inductive interfaces and the inductive interfaces in method 800.

In embodiments of the inductive interface 10 that include a ferrite core 11 not extending beyond the field device housing 2, the complementary inductive interface 30 may include a complementary ferrite core 32 around a portion of which a coil of wire 31 is circumferentially wrapped, and the physical connecting of the complementary inductive interface 30 with the inductive interface 10 includes placing the complementary ferrite core 32 of the complementary inductive interface 30 proximate to the ferrite core 11 of the inductive interface 10 to enable mutual magnetic coupling of the two interfaces.

The method 800 includes a step 820 of the service tool 50 energizing the complementary inductive interface 30. Through inductive coupling, the energized complementary inductive interface 30 energizes the inductive interface 10.

In some embodiments of the method 800, the energy transferred in step 820 from the complementary inductive interface 30 to the inductive interface 10 includes energy sufficient to energize and operate the communication circuit 14 of the field device 1. In this case, the method 800 includes a step 825 of energizing a communication circuit 14 within the field device 1 using energy received over the inductive interface 10 from the complementary inductive interface 30. In such embodiments, the field device communication circuit 14 is operational only when energized by the inductive interface 10.

The method 800 further includes a step 830 of initializing the field device communication circuit 14 and beginning the demodulation and modulation of data between the inductive interface 10 and the complementary inductive interface 30.

While various embodiments of an inductive interface and methods for using and constructing the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

What is claimed is:

1. A method of communicating with a field device, comprising:
   providing a field device including
     a housing including an orifice,
     a control electronics disposed within the housing and embodied to operate the field device,
     an inductive interface including a ferrite core and a plurality of wire loops circumferentially surrounding a portion of the ferrite core, wherein the ferrite core is at least partially disposed within the housing such that an end of the ferrite core extends through the orifice in the housing and beyond the housing and such that the plurality of wire loops is disposed within the housing, and a communications circuit electrically connected to the plurality of wire loops and to the control electronics, wherein the inductive interface is embodied to inductively couple with a complementary inductive interface having a plurality of complementary wire loops embodied to partially circumferentially surround the ferrite core, and wherein the inductive interface is further embodied to transfer data with the complementary inductive interface;

providing a communication device including the complementary inductive interface;

reversibly connecting the complementary inductive interface with the inductive interface such that the complementary inductive interface and the inductive interface are enabled to inductively couple, wherein reversibly connecting the complementary inductive interface with the inductive interface includes at least partially circumferentially surrounding the ferrite core with the plurality of complementary wire loops;

energizing the complementary inductive interface thereby energizing the inductive interface via an inductive coupling of the complementary inductive interface with the inductive interface; and communicating data across the inductive interface.

2. A method of communicating with a field device; comprising:

providing a field device including
a housing including an orifice,
a control electronics disposed within the housing and embodied to operate the field device,
an inductive interface including a ferrite core and a plurality of wire loops circumferentially surrounding a portion of the ferrite core, wherein the ferrite core is at least partially disposed within the housing such that an end of the ferrite core extends through the orifice in the housing and such that the plurality of wire loops is disposed within the housing, and
a communications circuit electrically connected to the plurality of wire loops and to the control electronics,
wherein the inductive interface is embodied to inductively couple with a complementary inductive interface having a complementary ferrite core and a plurality of complementary wire loops circumferentially surrounding a portion of the complementary ferrite core, and wherein the inductive interface is further embodied to transfer data with the complementary inductive interface;

providing a communication device including the complementary inductive interface;

reversibly connecting the complementary inductive interface with the inductive interface such that the complementary inductive interface and the inductive interface are enabled to inductively couple, wherein reversibly connecting the complementary inductive interface with the inductive interface includes axially aligning the complementary ferrite core with the ferrite core such that an air gap between the complementary ferrite core and the ferrite core is no more than approximately 2 millimeters;

energizing the complementary inductive interface thereby energizing the inductive interface via an inductive coupling of the complementary inductive interface with the inductive interface; and communicating data across the inductive interface.

3. The method of claim 2, wherein the inductive interface includes a ferrite core configured in a "C" shape having two outer ends, wherein the complementary inductive interface includes a complementary ferrite core configured in a "C" shape having two outer ends, and wherein reversibly connecting the complementary inductive interface with the inductive interface includes aligning the two outer ends of the complementary ferrite core with the two outer ends of the ferrite core such that an air gap between the two outer ends of the complementary ferrite core and the two outer ends of the ferrite core is no more than approximately 2 millimeters.

4. The method of claim 2, wherein the inductive interface includes a ferrite core configured in a "E" shape having three outer ends, wherein the complementary inductive interface includes a complementary ferrite core configured in a "E" shape having three outer ends, and wherein reversibly connecting the complementary inductive interface with the inductive interface includes aligning the three outer ends of the complementary ferrite core with the three outer ends of the ferrite core such that an air gap between the three outer ends of the complementary ferrite core and the three outer ends of the ferrite core is no more than approximately 2 millimeters.

* * * * *